July 24, 1956 W. H. TAIT ET AL 2,755,992
CENTRIFUGAL SEPARATORS
Filed Oct. 19, 1953 3 Sheets-Sheet 1

INVENTORS
William Henry Tait
Phil Prince Love
by Pierce, Scheffler + Parker. attys

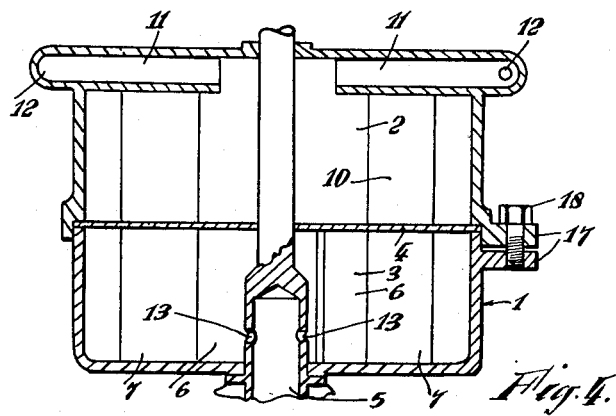
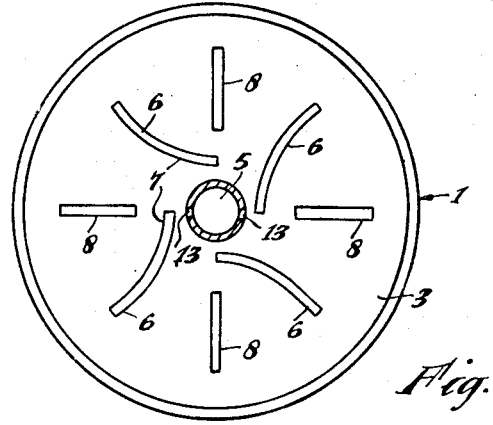
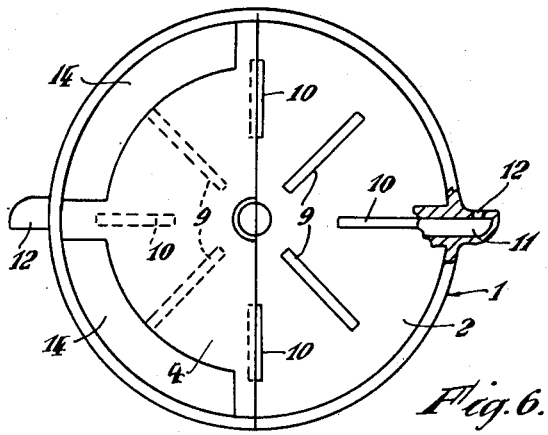

INVENTORS
William Henry Tait
Phil Prince Love
by Pierce, Scheffler & Parker
atty's United States Patent Office 2,755,992
Patented July 24, 1956

2,755,992

CENTRIFUGAL SEPARATORS

William Henry Tait and Phil Prince Love, Alperton, Wembley, England, assignors to The Glacier Metal Company Limited, Alperton, England, a British company Application October 19, 1953, Serial No. 386,969

10 Claims. (Cl. 233—23)

This invention relates to centrifugal separators, and is particularly concerned with improvements in centrifugal separators of the kind comprising a rotor to which oil or other liquid to be filtered is supplied under pressure and from which the liquid is discharged through nozzle means for driving the said rotor solely by reaction.

The invention is particularly applicable to centrifugal separators where the power available for driving the rotor is limited and the liquid to be separated is of such low viscosity, or the flow of liquid is so great, that power loss due to turbulence and viscous kinetic energy transfer in the rotor may be appreciable. When the power for driving the separator by reaction jets is derived from the pressure of lubricating oil or other liquid supplied under pressure, and is therefore definitely limited, it is essential that any source of power absorption due to turbulence or to changes in kinetic energy of the oil or liquid within the centrifuge as it passes from the entry radius to the maximum radius and then back to the exit radius, should be reduced as far as possible in order that the limited power available may be effectively utilised for driving the centrifuge at a sufficient speed to ensure effective separation.

The invention has for its object to provide improvements in centrifugal separators of the kind referred to whereby the acceleration of the oil or other liquid to the high tangential velocity necessary for centrifugal separation of impurities and the deceleration of the oil or other liquid before it leaves the centrifuge may be effected with the minimum of energy losses.

According to the present invention, radially arranged baffles are provided in the rotor bowl of the separator, said baffles having the parts thereof nearer the centre of the bowl curved so as to scoop the oil or other liquid as it enters the rotor and direct it smoothly towards the periphery of the rotor bowl. The curved parts of the baffles are designed having regard to the relative motion of the oil or other liquid as it enters the rotor so as to avoid as far as possible the introduction of turbulence. The baffles having the curved inner parts are in sufficient number to obviate any major vortices or similar energy-consuming currents being set up within the rotor. Towards the outer radius of the rotor, however, these baffles may be too far apart, and for the purpose of preventing the introduction of turbulence from this cause, intermediate radial baffles may be provided, said intermediate baffles having their inner edges further from the centre of the bowl than the inner edges of the main baffles. The outer edges of the main baffles may be spaced from the peripheral wall of the rotor bowl and the outer edges of the intermediate baffles also may be spaced from the peripheral wall of the rotor bowl. Alternatively, the main baffles may extend inwardly from the peripheral wall of the rotor bowl and the intermediate baffles also may extend from the peripheral wall of the rotor bowl.

By such means the oil or other liquid introduced into the rotor bowl moves outwards with an increasing tangential velocity at virtually the angular velocity of the rotor until it has the maximum tangential velocity for the separation of the impurities. The oil or other liquid then moves towards the centre with substantially the angular velocity of the rotor until it reaches exit channels and nozzles. Thus, energy losses are eliminated as far as possible and the necessary acceleration and deceleration of the oil or other liquid is effected smoothly and evenly with the minimum of turbulence and viscous energy transfer.

For the purpose of ensuring that all of the oil or other liquid introduced reaches the high speed peripheral part of the bowl for effective separation of impurities, a transverse baffle may be arranged in the rotor bowl to separate upper and lower compartments thereof, said baffle having openings adjacent the peripheral wall of the rotor bowl for flow of liquid from one compartment of the bowl to the other, the said radially arranged baffles being provided in the lower compartment of the bowl below the transverse partition. Similar radially arranged baffles may be provided in the upper compartment of the bowl. The radially arranged baffles in the upper compartment of the bowl may be constituted by extensions of the radially arranged baffles in the lower compartment of the bowl.

Outlet channels may communicate with reaction nozzles arranged at the top of the rotor bowl. Alternatively, vertically disposed outlet channels may communicate between the upper part of the bowl and reaction nozzles disposed at the bottom thereof. A pressure outlet may communicate with the upper part of the bowl.

By the present invention a reaction driven centrifugal separator of the full flow type may be effectively operated with lubricating oil at high through-put rates and also reaction driven centrifugal separators, whether full flow or by-pass, i. e. with or without a pressure outlet, may be effectively operated with low viscosity fluids, such as fuel oil or machine tool coolants.

The invention is hereinafter described, by way of example, with reference to the accompanying diagrammatic drawings, in which.

Figure 1:
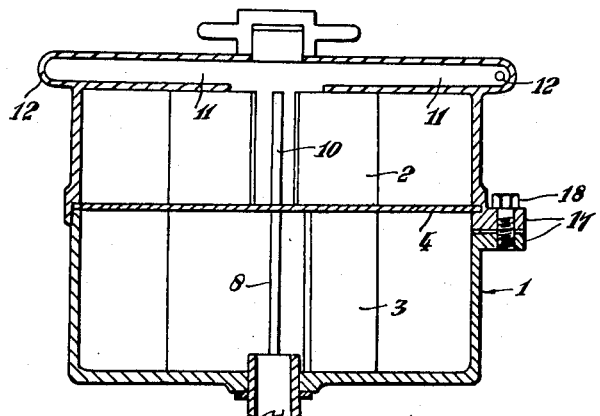
Fig. 1 is a sectional side elevation illustrating one embodiment of centrifugal separator according to the invention.
Figure 2:
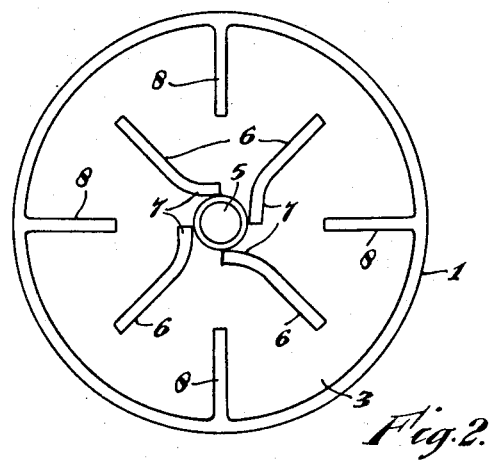
Fig. 2 is a top plan view of the lower part of the separator.
Figure 3:
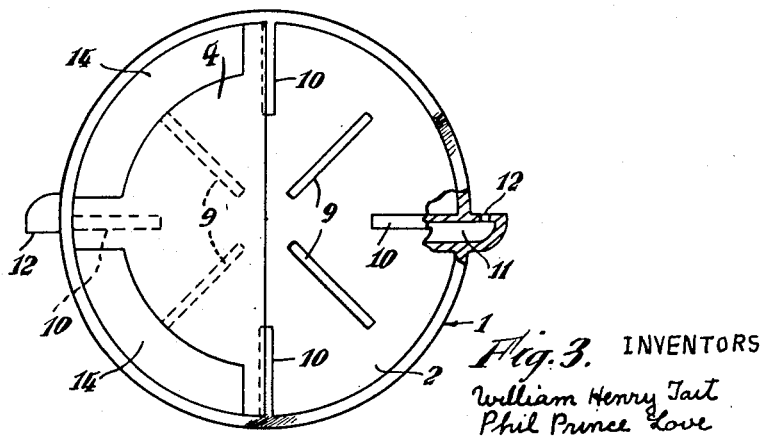
Fig. 3 is a bottom plan view of the upper part of the separator.
Figure 7:
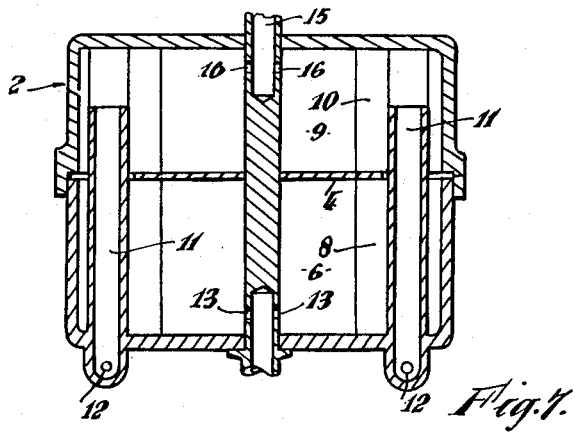
Figure 8:
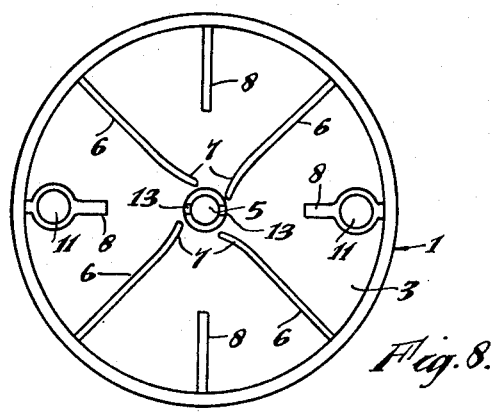
Figure 9:
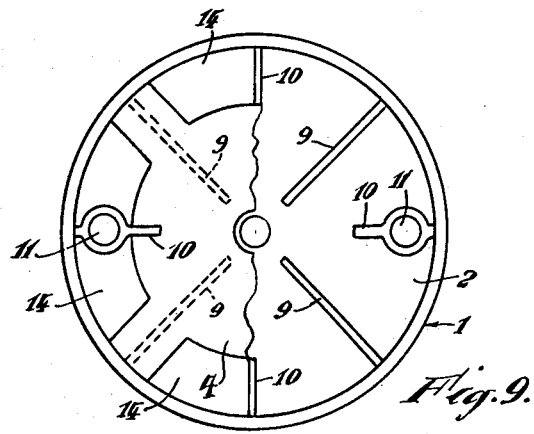

Figs. 4, 5 and 6 are views similar to Figs. 1, 2 and 3 respectively illustrating a modification; and Figs. 7, 8 and 9 are similar views illustrating a further modification.

In carrying the invention into effect according to one embodiment, and with reference to Figs. 1, 2 and 3 of the accompanying diagrammatic drawings, a rotor bowl 1 for a centrifugal separator of the kind referred to is divided into upper and lower compartments 2, 3 by a transverse baffle 4. The lower compartment 3 of the bowl 1 is provided with an inlet 5 for oil or other liquid to be filtered, and with a suitable number of main radially arranged baffles 6 having their inner parts 7 towards the centre of the bowl suitably curved to receive the oil or other liquid escaping from the inlet 5 and acting as scoops to direct the oil or other liquid towards the periphery of the rotor bowl with the minimum of turbulence. Intermediate one main baffle 6 and the next one, one or more intermediate baffles 8 are provided to extend from the periphery towards the centre but terminating at about half the radial distance, said intermediate baffles 8 being provided to minimise turbulence which might otherwise occur. In the upper compartment 2 of the rotor bowl, main and intermediate baffles 9, 10 respectively are similarly arranged except that the main baffles 9 do not have curved inner parts but may be flat and substantially radially disposed. Outlet channels 11 communicate with reaction nozzles 12 at the top of the separator and openings 14 in the transverse baffle 4 permit flow of liquid from the lower compartment 3 of the rotor into the upper compartment 2 thereof. The left hand half of the baffle 4 is shown in Fig. 3.

In the modification illustrated in Figs. 4, 5 and 6 the inlet 5 communicates with radial openings 13 through which the incoming liquid is distributed into the lower compartment 3 of the rotor. Furthermore, the intermediate baffles 8 in the lower compartment 3 of the rotor and the intermediate baffles 10 in the upper compartment 2 of the rotor are spaced from the peripheral wall so as to leave a clear space to facilitate removal of accumulated dirt by means of a scraper. The left hand half of the baffle 4 is shown in Fig. 6.

In the modification illustrated in Figs. 7, 8 and 9, the main baffles 6 and 9 respectively in the lower and upper compartments of the rotor may extend from the peripheral wall of the rotor and the intermediate baffles 8 and 10 also may extend from said peripheral wall. In this embodiment a pressure outlet 15 communicates with the upper compartment 2 of the rotor through radial openings 16 and the outlet passages 11 communicating with the reaction nozzles 12 may be vertically arranged and may, as shown in Figs. 8 and 9, be incorporated in diametrically opposite intermediate baffles 8 and 10.

Preferably, the upper and lower parts of the separator bowl are detachably connected as by the provision of co-acting flanges 17 and bolts 18 or by providing the parts with inter-engaging screw threads.

It will be understood that the invention is not limited to the particular embodiment hereinbefore described. For example, instead of the baffles being mainly flat and radially disposed, they may be otherwise suitably shaped and/or arranged. Furthermore, the baffles may be provided in the form of a baffle unit comprising a separate casting or assembly which is adapted to fit snugly into the rotor bowl before the cover thereof is applied. Alternatively, the baffles may be provided integrally with the top cover or nozzle plate.

What we claim is:

1. A centrifugal separator comprising a rotor bowl, a baffle extending substantially perpendicularly to the axis of said bowl and dividing said bowl into upper and lower chambers, openings in said baffle adjacent the outer edges thereof connecting said chambers, means for delivering liquid under pressure into the lower chamber adjacent said axis, radially arranged vertically disposed main baffles in said lower chamber for directing said liquid to the wall of said bowl, radially arranged baffles in said upper chamber for directing liquid from the wall of said bowl toward the axis thereof, outlet channels for liquid in said upper chamber and reaction nozzles communicating with said outlet channels.

2. A centrifugal separator according to claim 1, wherein intermediate radial baffles are provided, said intermediate baffles having their inner edges further from the centre of the bowl than the inner edges of said main baffles.

3. A centrifugal separator according to claim 2, wherein the outer edges of the intermediate baffles are spaced from the peripheral wall of the rotor bowl.

4. A centrifugal separator according to claim 2, wherein the intermediate baffles extend inwardly from the peripheral wall of the rotor bowl.

5. A centrifugal separator according to claim 1, wherein the outer edges of the main baffles are spaced from the peripheral wall of the rotor bowl.

6. A centrifugal separator according to claim 1, wherein the main baffles extend inwardly from the peripheral wall of the rotor bowl.

7. A centrifugal separator according to claim 1, wherein the radially arranged baffles in the upper component of the bowl are constituted by extensions of the radially arranged baffles in the lower compartment of the bowl.

8. A centrifugal separator according to claim 1, wherein the reaction nozzles are arranged at the top of the rotor bowl.

9. A centrifugal separator according to claim 1, wherein said outlet channels are vertically disposed and communicate between the upper part of the bowl and said reaction nozzles are disposed at the bottom thereof.

10. A centrifugal separator according to claim 1, wherein a pressure outlet communicates with the upper part of the bowl.

References Cited in the file of this patent

UNITED STATES PATENTS

| | | |
|---|---|---|
| 1,714,658 | Carter | May 28, 1929 |
| 2,002,629 | Cobb et al. | May 28, 1935 |
| 2,082,690 | Dorer | June 1, 1937 |